US012675650B1

(12) United States Patent
Tillich et al.

(10) Patent No.: US 12,675,650 B1
(45) Date of Patent: Jul. 7, 2026

(54) METHODS AND APPARATUS FOR GENERATING INTELLIGIBLE DATA SEGMENTS WITH LARGE LANGUAGE MODELS

(71) Applicant: Market Track, LLC, Chicago, IL (US)

(72) Inventors: Christian Joseph Tillich, Chicago, IL (US); Eric Benjamin Sherlock, Chicago, IL (US); John Marshall Morrow, Portland, TN (US)

(73) Assignee: Market Track, LLC, Chicago, IL (US)

( * ) Notice: Subject to any disclaimer, the term of this patent is extended or adjusted under 35 U.S.C. 154(b) by 0 days.

(21) Appl. No.: 19/307,575

(22) Filed: Aug. 22, 2025

(51) Int. Cl.
*G06F 40/40* (2020.01)
*G06Q 30/0204* (2023.01)

(52) U.S. Cl.
CPC ....... *G06F 40/40* (2020.01); *G06Q 30/02043* (2025.08); *G06Q 30/0205* (2013.01)

(58) Field of Classification Search
USPC .............................................. 704/7–10, 257
See application file for complete search history.

(56) References Cited

U.S. PATENT DOCUMENTS

| | | | | | |
|---|---|---|---|---|---|
| 8,650,184 | B2 * | 2/2014 | Kowalchuk | ............ | G06Q 30/02 |
| | | | | | 706/14 |
| 9,348,809 | B1 * | 5/2016 | Zhao | ..................... | G06F 40/284 |
| 9,460,080 | B2 * | 10/2016 | Zhao | ....................... | G06F 40/53 |
| 2015/0325235 | A1 * | 11/2015 | Levit | ..................... | G06F 40/295 |
| | | | | | 704/257 |
| 2022/0398524 | A1 * | 12/2022 | Abdullah | .............. | G06F 40/226 |
| 2024/0012996 | A1 * | 1/2024 | Chosa | .................... | G06N 5/041 |
| 2024/0029714 | A1 * | 1/2024 | Chintagunta | ........... | G06F 40/30 |
| 2024/0202216 | A1 * | 6/2024 | Gune | .................. | G06F 16/2237 |
| 2024/0330780 | A1 * | 10/2024 | Ramrakhiyani | ....... | G06N 3/045 |

OTHER PUBLICATIONS

Adolfsson, A. et al., "To Cluster, or Not to Cluster: An Analysis of Clusterability Methods," arXiv:1808.08317 [stat.ML], Aug. 24, 2018. Retrieved from https://arxiv.org/abs/1808.08317; 30 pages.

(Continued)

*Primary Examiner* — Leonard Saint-Cyr
(74) *Attorney, Agent, or Firm* — COOLEY LLP

(57) ABSTRACT

A method includes determining, without human intervention, statistically significant variables in a cluster of a first data set from variables in the first data set or second data sets. The cluster is associated with a consumer type. The method also includes generating pseudosentences based on high/low values for each statistically significant variable. The method also includes sending a signal to cause the pseudosentences to be inserted into a no-code prompt for a large language model to predict a segment description for the consumer type. The first no-code prompt has a code-style to reduce a variance of the segment description. The segment description is a representation of relationships among each statistically significant variable based on the set of pseudosentences. The method also includes sending, from the first compute device and to a second compute device, data representing the segment description.

20 Claims, 8 Drawing Sheets

(56) References Cited

OTHER PUBLICATIONS

Chakravarthy, A. "Package 'RFclust': Random Forest Cluster Analysis," The Comprehensive R Archive Network (CRAN), Jun. 21, 2022. Retrieved from https://cran.r-project.org/web/packages/RFclust/RFclust.pdf, [retrieved Aug. 29, 2025]; 5 pages.

Hartigan, P. M. "Algorithm AS 217: Computation of the Dip Statistic to Test for Unimodality," Journal of the Royal Statistical Society. Series C (Applied Statistics), May 1985, JSTOR:2347485, 34(3):320-325.

Ishwaran, H. et al., "randomForestSRC: sidClustering Vignette," Fast Unified Random Forests for Survival, Regression, and Classification (RF-SRC), Apr. 2021; 6 pages.

Mcinnes, L. et al., "hdbscan: Hierarchical density based clustering," The Journal of Open Source Software, Mar. 21, 2017, 2(11):205; 2 pages.

Mcinnes, L. et al., "UMAP: Uniform Manifold Approximation and Projection for Dimension Reduction," arXiv:1802.03426 [stat.ML], Feb. 9, 2018. Retrieved from https://arxiv.org/pdf/1802.03426v1; 18 pages.

Pedregosa, F. et al., "Scikit-learn: Machine Learning in Python," Journal of Machine Learning Research (JMLR), Oct. 2011, 12(85):2825-2830.

Rurlus, "diptest: A Python/C(++) implementation of Hartigan & Hartigan's dip test for unimodality," pypi.org, first publication date unknown. Published Jul. 10, 2025 [online] at https://pypi.org/project/diptest/, [retrieved on Aug. 29, 2025]; 5 pages.

* cited by examiner

100

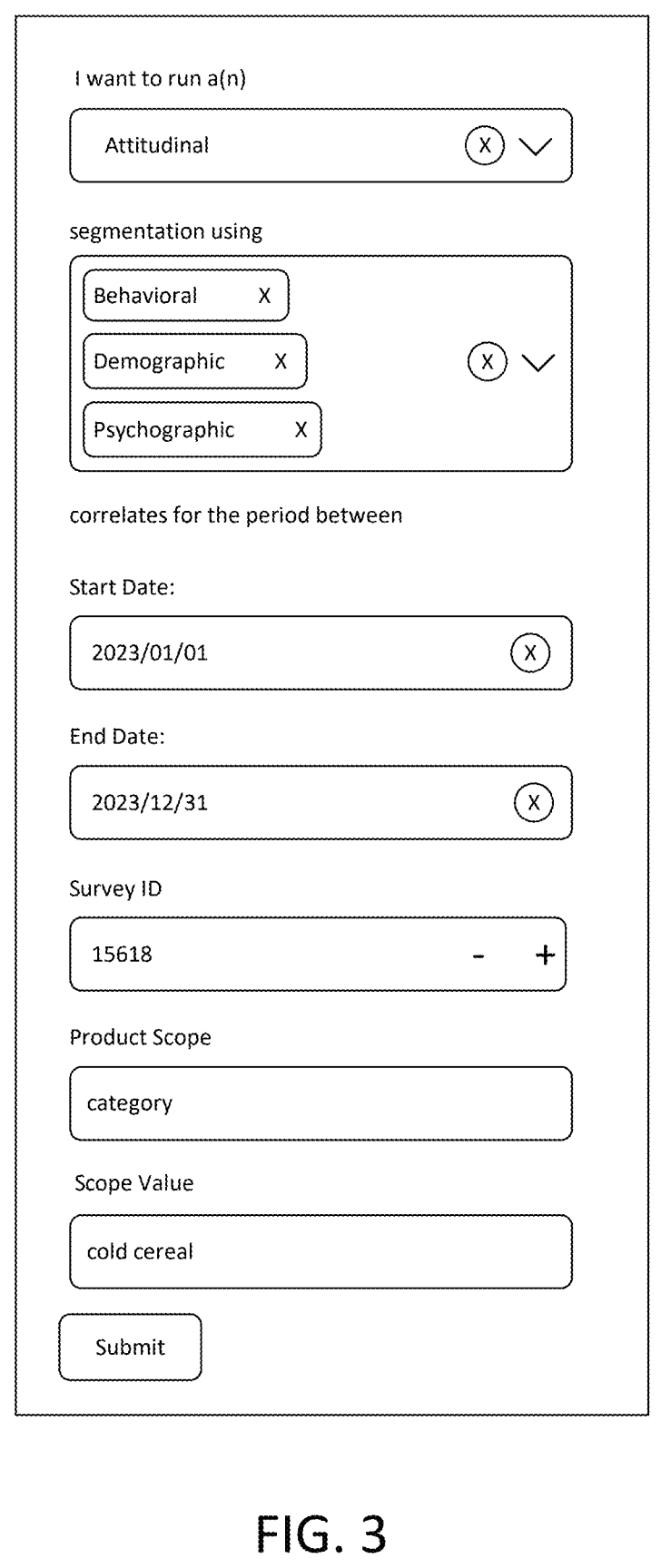

I want to run a(n)

Attitudinal    (X) ⌄ segmentation using

Behavioral       X

Demographic      X          (X) ⌄

Psychographic    X correlates for the period between

Start Date:

2023/01/01       (X)

End Date:

2023/12/31       (X)

Survey ID

15618         -    +

Product Scope category

Scope Value cold cereal

Submit

FIG. 3

Millenial Online Cocktail Enthusiasts

Roleplay as a world-class marketing segmentation analyst. Your job is to look at distinguishing features of a customer segment containing example shoppers and come up with a name.

```
SegBot {
    BehavioralFacts {
        ecomm share of total spent 1714.0% larger than outgroup
        channel 2854.0% larger than outgroup when channel is limited to online
        banner 5226.0% larger than outgroup when banner is limited to walmartcom
        banner 2697.0% larger than outgroup when banner is limited to amazoncom
        category 318.0% larger than outgroup when category is limited to unknown
        spend per trip 57% larger than outgroup
    }
    DemographicFacts {
        37.0% less likely to state their 'age_gen_long=Boomers+ (< 1965)' compared to outgroup.
        40.0% less likely to state their 'employment_status=Retired' compared to outgroup.
        24.0% more likely to state their 'has_children=Yes' compared to outgroup
    }
    PsychographicFacts {
        54.0% less likely to say their online shopping attitudes is 'prefers physical stores' compared to
    outgroup.
        13.0% more likely to say their online shopping attitudes is 'saves me time' compared to outgroup.
        52.0% more likely to say their online shopping attitudes is 'buys in bulk online' compared to
    outgroup.
    }
    /name -- generate a name for the segment 1 to 3 words in length
    /describe -- write a single paragraph describing the segment
}
```

FIG. 5A

```
                              Rural Traditionalists

Roleplay as a world-class marketing segmentation analyst. Your job is to look at distinguishing
features of a customer segment containing example shoppers and come up with a name.

SegBot [
    BehavioralFacts [
        banner 5953.0% larger than outgroup when banner is limited to food_lion
        total brands 25.0% smaller than outgroup
        total banners 23.0% smaller than outgroup
        ecomm share of total spent 98.0% smaller than outgroup
        banner 253% larger than outgroup when banner is limited to meijer
        trip type 51.0% smaller than outgroup when trip type is limited to Express Lane (3-10 items)
    ]
    DemographicFacts [
        27.0% less likely to state their 'urbanicity=Urban' compared to outgroup.
        35.0% less likely to state their 'lifestyle=Urban Middle Class' compared to outgroup.
        12.0% less likely to state their 'income_bucket_long=High Income (Over $80k)' compared to
    outgroup.
        24.0% more likely to state their 'lifestyle=Rural Middle Class' compared to outgroup.
    ]
    PsychographicFacts [
        29.0% less likely to say their shopping behavior is 'deal focused  brand loyalist' compared to
    outgroup.
    ]
    /name ~ generate a name for the segment 1 to 3 words in length
    /describe ~ write a single paragraph describing the segment
]
```

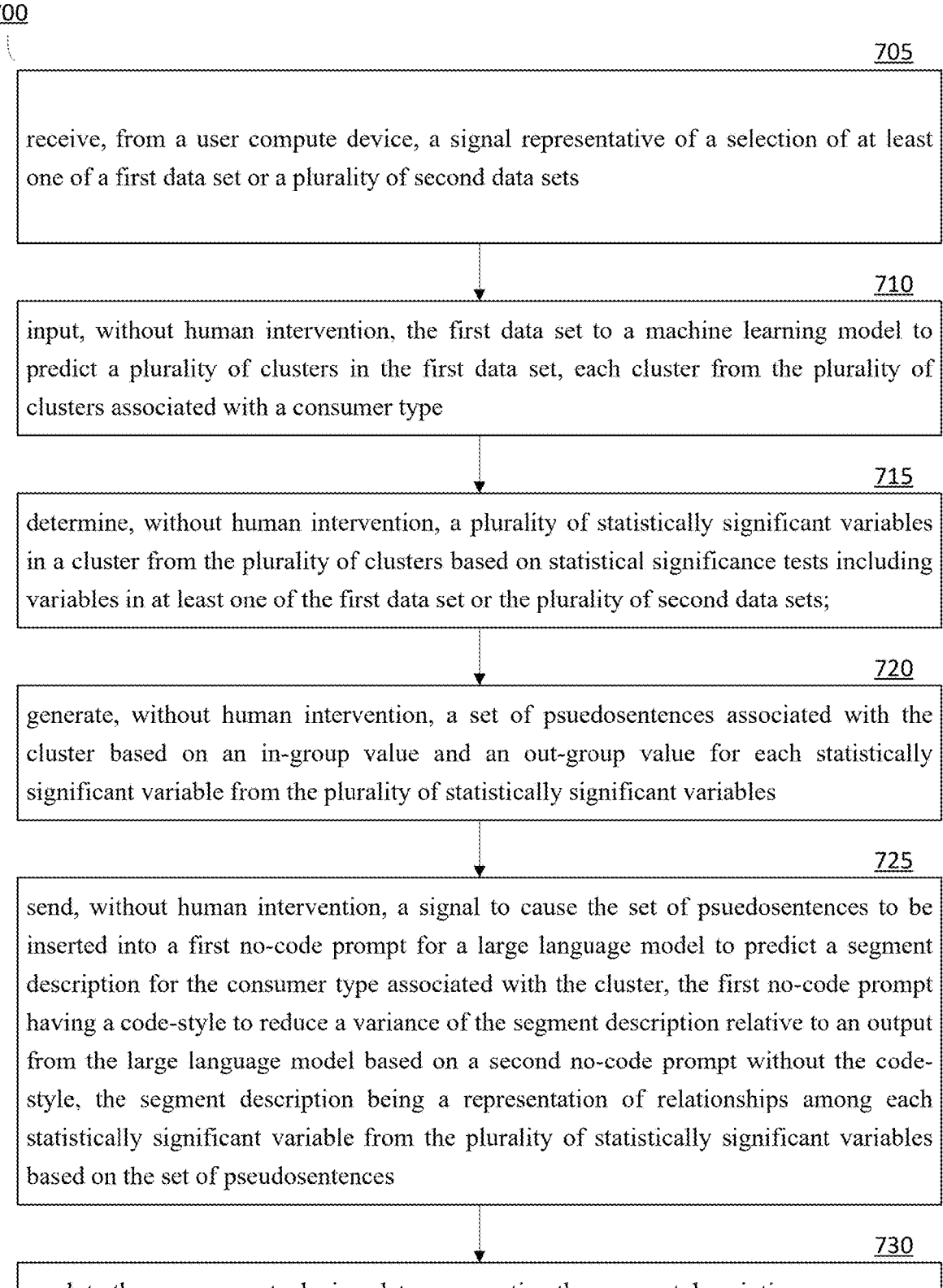

705 receive, from a user compute device, a signal representative of a selection of at least one of a first data set or a plurality of second data sets

710 input, without human intervention, the first data set to a machine learning model to predict a plurality of clusters in the first data set, each cluster from the plurality of clusters associated with a consumer type

715 determine, without human intervention, a plurality of statistically significant variables in a cluster from the plurality of clusters based on statistical significance tests including variables in at least one of the first data set or the plurality of second data sets;

720 generate, without human intervention, a set of psuedosentences associated with the cluster based on an in-group value and an out-group value for each statistically significant variable from the plurality of statistically significant variables

725 send, without human intervention, a signal to cause the set of psuedosentences to be inserted into a first no-code prompt for a large language model to predict a segment description for the consumer type associated with the cluster, the first no-code prompt having a code-style to reduce a variance of the segment description relative to an output from the large language model based on a second no-code prompt without the code-style, the segment description being a representation of relationships among each statistically significant variable from the plurality of statistically significant variables based on the set of pseudosentences

730 send, to the user compute device, data representing the segment description

FIG. 7

METHODS AND APPARATUS FOR GENERATING INTELLIGIBLE DATA SEGMENTS WITH LARGE LANGUAGE MODELS

TECHNICAL FIELD

Embodiments of the present disclosure relate to systems, devices, and methods for generating intelligible segments, and more specifically towards generating and evaluating intelligible segments with large language models.

BACKGROUND

Market segmentation, or the process of dividing a broad target market into smaller, more specific groups (or segments) based on shared characteristics, can be a valuable tool a business can use to better understand their customers, tailor their marketing messages, and ultimately increase the effectiveness of their market campaigns. The target market can be segmented by, for example, demographics (e.g., age, gender, income, education level, etc.), geographics (e.g., location, region, climate, etc.), psychographics (e.g., lifestyle, personality, values, etc.), and/or behavioral characteristics (e.g., buying habits, social media preferences, etc.). While gathering customer insights early can be exceptionally valuable, the investment of time and capital towards known market segmentations can be prohibitive for emerging or mid-market brands. A need exists for an easy, quick, and cost-effective solution to produce customer insights for such emerging or mid-market brands, which otherwise would not invest in known market segmentations.

SUMMARY

In some embodiments, a non-transitory, processor-readable medium stores instructions that, when executed by a processor, cause the processor to receive, from a user compute device, a signal. The signal is representative of a selection of at least one of a first data set or a plurality of second data sets. The non-transitory, processor-readable medium also stores instructions that cause the processor to input, without human intervention, the first data set to a machine learning model to generate a plurality of clusters in the first data set. Each cluster from the plurality of clusters is associated with a consumer type. The non-transitory, processor-readable medium also stores instructions that cause the processor to determine, without human intervention, a plurality of statistically significant variables in a cluster from the plurality of clusters based on statistical significance tests. The statistical significance tests include variables in at least one of the first data set or the plurality of second data sets. The non-transitory, processor-readable medium also stores instructions that cause the processor to generate, without human intervention, a set of pseudosentences associated with the cluster based on an in-group value and an out-group value for each statistically significant variable from the plurality of statistically significant variables. The non-transitory, processor-readable medium also stores instructions that cause the processor to send, without human intervention, a signal to cause the set of pseudosentences to be inserted into a first no-code prompt for a large language model to predict a segment description for the consumer type associated with the cluster. The first no-code prompt has a code-style to reduce a variance of the segment description relative to an output from the large language model based on a second no-code prompt without the code-style. The segment description is a representation of relationships among each statistically significant variable from the plurality of statistically significant variables based on the set of pseudosentences. The non-transitory, processor-readable medium also stores instructions that cause the processor to send, to the user compute device, data representing the segment description.

In some embodiments, a method includes determining, using a processor of a first compute device and without human intervention, a plurality of statistically significant variables in a cluster based on a statistical significance test. The cluster is associated with a first data set. The statistical significance test includes variables in at least one of the first data set or a plurality of second data sets. The cluster is associated with a consumer type. The method also includes generating, using the processor and without human intervention, a set of pseudosentences associated with the cluster based on a high value and a low value for each statistically significant variable from the plurality of statistically significant variables. The method also includes sending, without human intervention, a signal to cause the set of pseudosentences to be inserted into a first no-code prompt for a large language model to predict a segment description for the consumer type associated with the cluster. The first no-code prompt has a code-style to reduce a variance of the segment description relative to output from the large language model based on a second no-code prompt without the code-style. The segment description is a representation of relationships among each statistically significant variable from the plurality of statistically significant variables based on the set of pseudosentences. The method also includes sending, from the first compute device and to a second compute device, data representing the segment description.

In some embodiments, a non-transitory, processor-readable medium stores instructions that, when executed by a processor, cause the processor to send, to a user compute device, a signal to cause a display at the user compute device to display a plot. The plot represents a first plurality of clusters in a first data set. Each cluster from the first plurality of clusters is associated with a consumer type. The non-transitory, processor-readable medium also stores instructions that cause the processor to receive, from the user compute device, a signal indicative of a request associated with an evaluation of the plot. The non-transitory, processor-readable medium also stores instructions that cause the processor to input, without human intervention, the first data set to a machine learning model to generate a second plurality of clusters in the first data set. The non-transitory, processor-readable medium also stores instructions that cause the processor to determine, without human intervention, a plurality of statistically significant variables in a cluster from the second plurality of clusters based on a statistical significance test. The statistical significance test is for variables in at least one of the first data set or a plurality of second data sets. The non-transitory, processor-readable medium also stores instructions that cause the processor to generate, without human intervention, a set of pseudosentences associated with the cluster from the second plurality of clusters based on an in-group value and an out-group value for each statistically significant variable from the plurality of statistically significant variables. The non-transitory, processor-readable medium also stores instructions that cause the processor to send, without human intervention, a signal to cause the set of pseudosentences to be inserted into a first no-code prompt for a large language model to predict a segment description for the consumer type associated with the cluster from the second plurality of clusters. The first no-code prompt has a code-style to reduce a variance of the segment description relative to output from the large language model based on a second no-code prompt without the code-style. The segment description is a representation of relationships among each statistically significant variable from the plurality of statistically significant variables based on the set of pseudosentences. The non-transitory, processor-readable medium also stores instructions that cause the processor to send, to the user compute device, data representing the segment description for the cluster from the second plurality of clusters.

BRIEF DESCRIPTION OF THE DRAWINGS

FIG. 3 shows an example image of a user interface associated with the market segmentation module, according to an embodiment.

FIG. 5A shows an example image of a code-style prompt with pseudosentences for a distinct cluster, according to an embodiment.

FIG. 5B shows an example image of a code-style prompt with pseudosentences for an ambiguous cluster, according to an embodiment.

FIG. 7 shows a flow diagram of an example method for running the market segmentation module, according to an embodiment.

DETAILED DESCRIPTION

Some embodiments of the present disclosure can be cost-effective solutions to produce bespoke market segmentations from market survey data. Some embodiments can generate segmentations from minimal user input, returning results in hours and with near-negligible computational costs. By contrast, segmentations that are interpreted solely by humans often take months to complete, and can cost upwards of six to seven figures. Some embodiments can convert variable importance measures into "pseudosentences", which as used herein can include text that is intelligible to a reader, and cause the pseudosentences to be inserted into a large language model (LLM) for interpretive results, which can include text, images, video, audio, or the like. Some embodiments can enable a user to edit or rewrite the interpretive results. In this way, users can have agency over the outputs.

Figure 1:
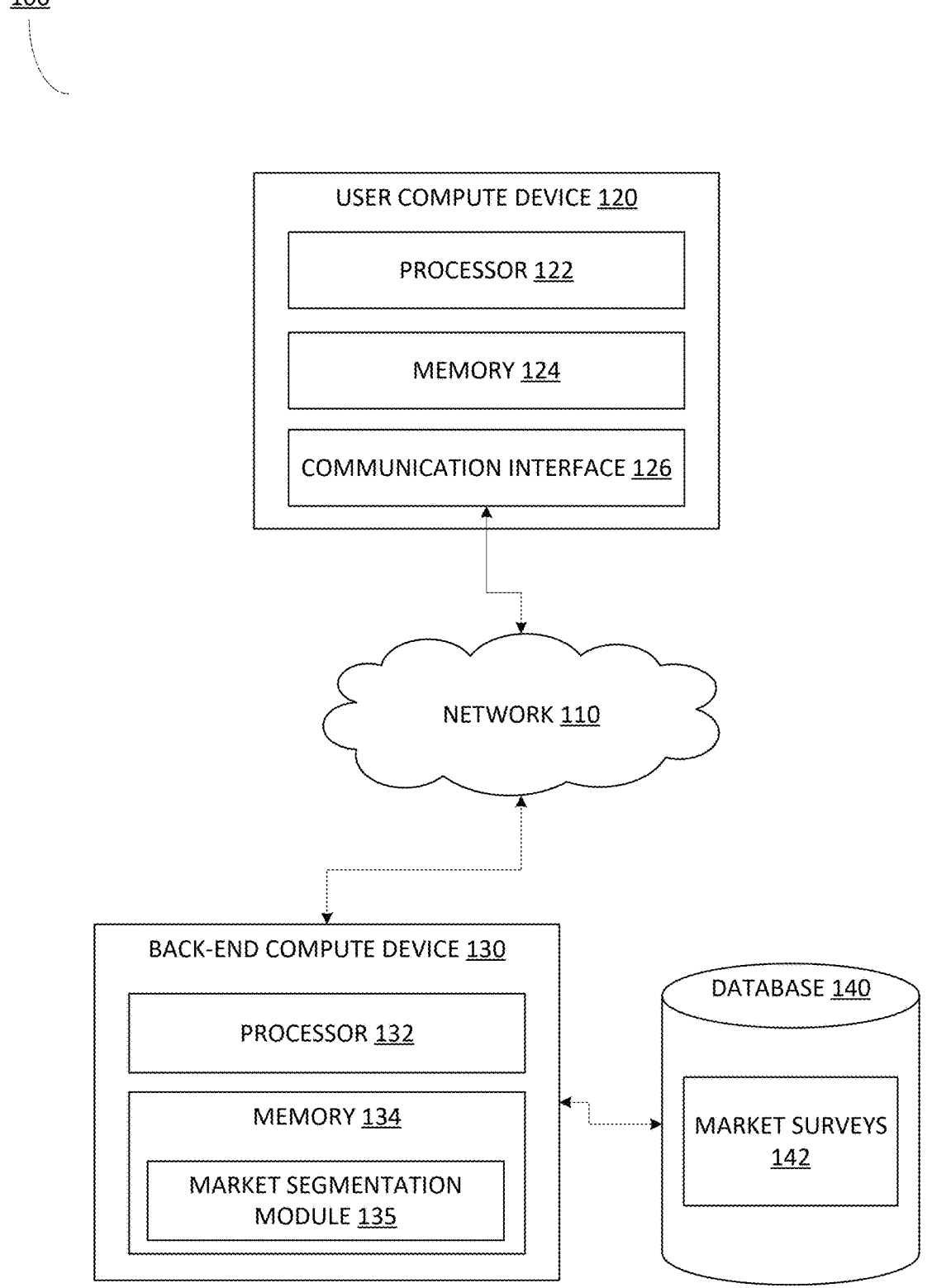
FIG. 1 shows a block diagram of a system that includes a market segmentation module, according to an embodiment.

FIG. 1 shows a block diagram of a system 100 including a market segmentation module, according to an embodiment. The system 100 includes a network 110, a user compute device 120, a back-end compute device 130, and a database 140.

The network 110 can be any type of network(s) such as, for example, a local area network (LAN), a wireless local area network (WLAN), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, and/or any other suitable network. The network can include various configurations and protocols, including, for example, Bluetooth®, Bluetooth® LE, the Internet, World Wide Web, intranets, virtual private networks, wide area networks, local networks, private networks using communication protocols proprietary to one or more companies, Ethernet, Wi-Fi® and/or Hypertext Transfer Protocol (HTTP), cellular data networks, satellite networks, free space optical networks and/or various combinations of the foregoing. Such communication can be facilitated by any device capable of transmitting data to and from other compute devices, such as a modem(s) and/or a wireless interface(s). The network 110 can communicatively couple the user compute device 120 with the back-end compute device 130.

The user compute device 120 can be or include any suitable hardware-based computing device configured to send and/or receive data and configured to store data. For example, in some embodiments, the user compute device 120 can be a personal computer (PC), a workstation, a smartphone, a smartwatch, a tablet, a laptop computer, and/or the like. In some implementations, the user compute device 120 can receive inputs and/or data directly from a user interacting with the user compute device 120 via an input/output device(s) such as a keyboard, mouse, display (not shown in FIG. 1). The user compute device 120 includes a processor 122, a memory 124, and a communication interface 126.

The processor 122 can be a hardware-based integrated circuit (IC) and/or any other suitable processing device configured to run or execute a set of instructions and/or code stored, for example, in the memory 124. For example, the processor 122 can be a general-purpose processor, a central processing unit (CPU), a graphics processing unit (GPU), an accelerated processing unit (APU), an application specific integrated circuit (ASIC), a network processor, a front-end processor, a field programmable gate array (FPGA), a programmable logic array (PLA), and/or the like. The processor 122 can be in communication with the memory 124 via any suitable interconnection, system bus, circuit, and/or the like. As described in further detail herein, the processor 122 can include any number of engines, processing units, cores, etc. configured to execute code, instructions, modules, processes, and/or functions associated with receiving requests (e.g., requests associated with a user interacting with the user compute device 120), sending requests (e.g., to the back-end compute device 130 via the network 110), and/or processing data (e.g., data sent by the back-end compute device 130).

The memory 124 can be, for example, a stack memory, a random-access memory (RAM), a memory buffer, a magnetic disk (e.g., hard drive memory), a semiconductor-based storage device (e.g., a solid-state drive), a read-only memory (ROM), an erasable programmable read-only memory (EPROM), a flash memory, and/or the like. The memory 124 can be configured to store, for example, one or more software modules and/or code that can include instructions that can cause the processor 122 to perform one or more processes, functions, and/or the like.

The communication interfaces 126 can be and/or include hardware component(s) such as, for example, a network interface card (NIC), a Wi-Fi® transceiver, an Ultra-Wideband (UWB) transceiver, a Bluetooth® transceiver, a near-field communication (NFC) transceiver, an electronic connector, and/or the like that can facilitate data communication between the user compute device 120 and devices (e.g., the back-end compute device 130 or another device not shown in FIG. 1).

As used herein, a "back-end" compute device can refer to a compute device that is remote relative to the user compute device 120 but is in operable communication with the user compute device 120, for example, during time periods were compute devices 120 and 130 are both operating. The back-end compute device 130 can be or include any suitable hardware-based computing device configured to send and/or receive data via the network 110 and configured to store data. For example, in some embodiments, the back-end compute device 130 can be or include a personal computer (PC), a workstation, a server(s) (e.g., "the cloud"), a group of servers, a smartphone, a smartwatch, a tablet, a laptop computer, and/or the like. In some implementations, the back-end compute device 130 can receive inputs and/or data directly from a user interacting with the back-end compute device 130 via input/output device(s) (not shown). The back-end compute device 130 includes a processor 132, a memory 134, and a communication interface (not shown). The communication interface of back-end compute device 130 can be structurally similar to the communication interface 126, and can connect back-end compute device 130 with network 110.

The processor 132 can be structurally similar to the processor 122. The processor 132 can be in communication with the memory 134 via any suitable interconnection, system bus, circuit, and/or the like. As described in further detail herein, the processor 132 can include any number of engines, processing units, cores, etc. configured to execute code, instructions, modules, processes, and/or functions associated with receiving requests from the user compute device 120 (or another compute device not shown in FIG. 1), running the market segmentation module 135 (e.g., in response to a receiving a request), and sending data to the user compute device 120 (or another compute device not shown in FIG. 1).

The memory 134 can be structurally similar to the memory 124. The memory 134 can be configured to store, for example, one or more software modules and/or code that can include instructions that can cause the processor 132 to perform one or more processes, functions, and/or the like. The memory includes market segmentation module 135.

The market segmentation module 135 can be code and/or one or more software modules that, when executed by a processor (e.g., the processor 122 and/or the processor 132), can cause the processor to produce segment descriptions associated with the market surveys 142. Known systems typically use human intervention (a "human-in-the-loop") to interpret the segment/cluster label, and provide some intuition regarding why the compression strategy laid out the observations on the axes it chose, or why users in one group are different from users in another group. By contrast, the market segmentation module 135 can determine and interpret clusters without human intervention. The market segmentation module 135 can include various sub-modules, which are described in further detail herein with respect to FIG. 2.

While shown and described in FIG. 1 as being stored in the memory 134 (e.g., being "cloud-hosted" by the back-end compute device 130), in some implementations, the market segmentation module 135 can be stored in the memory 124 of the user compute device 120 (e.g., run "locally" relative to a user of the market segmentation module 135).

In some implementations, market segmentation module 135 can have a programmable interface, such as, for example, an application programmable interface (API) that can enable the market segmentation module 135 to interface with other modules (not shown in FIG. 1), devices, and/or databases. For example, the API can be configured to facilitate the execution of queries against a database (e.g., the database 140 of FIG. 1), to send prompts to and receive responses from a large language model (not shown), to access, and/or edit model artifacts that are stored in a cloud service, and/or the like. The API can be configured to function as a model development framework, enabling a user to customize parameters of the various modules included within the market segmentation module 135. In effect, the API can provide more technical users with a set of "building blocks" to assist in building a segmentation with a variety of valid strategies. The model development framework can be implemented using, for example, python (e.g., SciKit Learn, etc.), R (e.g., tidymodels, etc.), and/or the like. The model development framework can enable the processor 132 to iterate through various parameters quickly to finetune machine learning models accessed by the market segmentation module 135.

The database 140 can be any suitable data storage structure(s) such as, for example, a table, repository, a relational database, an object-oriented database, an object-relational database, a structured query language (SQL) database, an extensible markup language (XML) database, and/or the like. The database 140 can be communicatively coupled to the back-end compute device 130 via, for example, a wired or wireless connection. The database 140 can be searched, written to, or otherwise modified and maintained by the processor 132, or another processor (not shown in FIG. 1). The database 140 includes market surveys 142.

The market surveys 142 can be and/or include representations (e.g., text, images, etc.) of responses to questions devised to understand a target audience. Each question can be associated with a variable that characterizes the respondent. For example, a question posing an age of a user, and a response indicating the age (also referred to herein as a variable value), can be associated with an "age" variable. In some instances, a variable can be in the form of a question such as, for example, "has children ages 0-5?", which can be a modified version of an original question posed in the market survey (e.g., "do you have children under 5 years old?"). Based on the question, a variable can be categorized into one or more groups, including demographic variables, attitudinal variables, behavioral variables, and/or psychographic variables. Based on the number of possible values, the variable can be further categorized as a categorical variable (e.g., having a fixed number of possible values) or a free response variable (e.g., not having a fixed number of possible values). Some variables can be categorized according to a scale (also referred to herein as "scaling variable"), such as a Likert scale, which presents a series of responses along a continuum that represent a degree of agreement or disagreement with a statement. Still, other variables can be categorized as numerical variables, which can have values associated with a quantity (e.g., an amount of money spent, a number of units held, a percentage of a budget, etc.). Across the market surveys 142, many respondents can indicate responses relating to a single variable. Such values can be mapped to the single variable as related entries in a data structure (e.g., a table, etc.), which are also referred to herein as data sets. The market surveys 142 can be categorized into one or more data sets based on the categories of variables therein. For example, a demographic data set can represent values of any variable that is categorized as a demographic variable, many of which can be, for example, categorical variables. Each data set can include certain variables (e.g., represented as text) associated with the market surveys 142.

The demographic data set can include values of categorical variables such as, for example, a user identifier, age (or age derivatives), gender, ethnicity, urbanicity (e.g., rural, suburban, etc.), income (e.g., expressed by a range of values), education level, employment status, marital status, household size, lifestyle (e.g., rural affluent, suburban middle class, etc.), life stage (e.g., adult single, small family, senior couple), and/or the like. The attitudinal data set can include values of categorical variables and/or values of scaling variables, examples of which are given in table 2 and table 3, respectively. The psychographic data set can include values of categorical variables. The behavioral data set can include values of numeric variables, an example of which is given in table 7. The market segmentation module 135 can encode (e.g., one-hot encoding, etc.) categorical variables into a numerical format suitable for further processing.

In use, the back-end compute device 130 can receive a request from the user-compute device 120 to generate a segment description given a "focus" data set designated by the user. In response, the market segmentation module 135 can cause the processor 132 to compress variables in the focus data set and/or to segment variables in the focus data set to produce segments/clusters of variables. For each variable in the focus data set and remaining data sets (the "correlation" data sets), the market segmentation module 135 can cause the processor 132 to test for feature importance, which can be measured by a correlation strength of that variable to any cluster in the focus data set. The market segmentation module 135 can cause the processor 132 to convert the correlation strength for significant variables into pseudosentences, which can describe how each variable is related to each segment. The market segmentation module 135 can cause the processor 132 to insert the pseudosentences into a prompt for an LLM (not shown). The LLM can be a machine learning model configured to process and generate intelligible text, images, video, audio, and/or other suitable outputs. The LLM can output a segment description. The market segmentation module 135 can cause the processor 132 to update the segment description in response to further input from a user of the system. An example implementation for executing the market segmentation module 135 at a hardware level is described in further detail below.

In some implementations, the market segmentation module 135 can include instructions that cause the back-end compute device 130 to dedicate computational resources (e.g., CPU cores, RAM, disk space, etc.) to one or more virtual machines (e.g., Amazon® EC2, Google® compute engine, Microsoft® azure, etc.), which can be run continuously and/or sporadically (e.g., in response to processing requests; "on-demand"). For example, the market segmentation module 135 can cause the back-end compute device 130 to deploy a virtual machine to host a user interface. The virtual machine that hosts the user interface can be continuously available. The user compute device 120 can interface with the user interface via the network 110. In response to receiving request(s) from the user compute device 120 (e.g., an indication to segment a data set), the back-end compute device 130 can be caused to initiate and deploy additional virtual machine(s), which can process the request(s). For example, the additional virtual machine(s) can include certain sub-modules of the market segmentation module 135 (also referred to herein as the "processing" modules), which can cause the virtual machine to, for example, construct, compress, cluster, and/or profile data sets, and/or generate output using a large language model. There are various benefits to partitioning the sub-modules of the market segmentation module 135 across different virtual machines. For example, by separating the user interface module from the various "processing" modules in different virtual machines, the virtual machine dedicated towards processing input and generating output can be configured to store information about a current request and not retain information about previous requests (e.g., a "stateless" virtual machine). This can improve performance for one or more users of the system, for example, when the back-end compute device 130 receives multiple additional requests while processing a prior request. Additionally, separating the user interface and the API functionality across different virtual machines can facilitate complex interaction with machine learning model parameters (e.g., a compression model, a cluster model, or other model), for example, by API users.

In some instances, a workflow management platform (e.g., Airflow®, etc.) can allocate the appropriate computational resources to the additional virtual machine(s), based on the request(s). and can store results in the memory 134 or other memory (e.g., memory included in a cloud-based storage service such as Amazon® S3). In response to receiving multiple requests from multiple user compute devices (not shown), the back-end compute device 130 can dedicate additional computational resources to one or more virtual machines ("vertically scale"). Vertical scaling can improve individual virtual machine runtimes, for example, during data set construction, compression and/or clustering, each of which can run more efficiently when run in parallel (e.g., on separate threads of a virtual machine).

Figure 2:
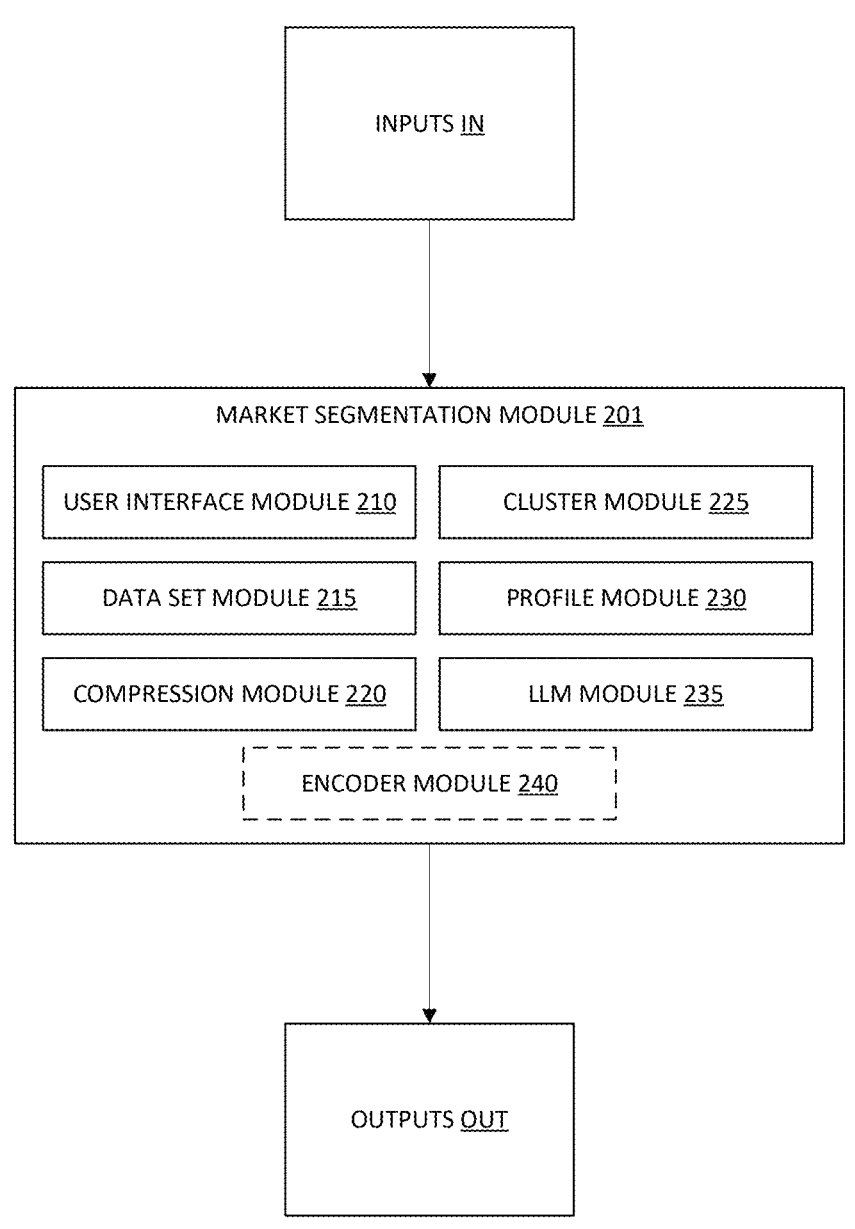
FIG. 2 shows a block diagram of a market segmentation module, according to an embodiment.

FIG. 2 shows a block diagram of a market segmentation module 201, according to an embodiment. The market segmentation module 201 can be a set of instructions, code, and/or one or more software modules that can be stored in a memory (e.g., the memory 124 or the memory 134 of FIG. 1) and can be executed by a processor (e.g., the processor 122 or the processor 132 of FIG. 1). The processor can cause the market segmentation module 201 to receive inputs IN and produce outputs OUT. The market segmentation module 201 includes a user interface module 210, a data set module 215, a compression module 220, a cluster module 225, a profile module 230, an LLM module 235, and optionally an encoder module 240.

The inputs IN can be representative of selections made by a user of the market segmentation module 135. As shown and described with respect to FIG. 3, the inputs IN can be and/or include a market survey (e.g., the market surveys 142 of FIG. 1) or at least a portion of a market survey (e.g., a filtered market survey) as represented by various data sets. For example, the inputs IN can be and/or include an attitudinal data set, a behavioral data set, a demographic data set, and/or a psychographic data set. The user can specify which data set among the inputs IN is configured to be a "focus" data set and which, if any, are configured to be "correlation" data sets. As used herein, a focus data set can be a data set that is configured to be segmented via the compression module 220 and/or the cluster module 225. As used herein, correlation data sets can be data sets that are not configured to be segmented, but which can be tested for correlations among variables in the focus data set and the correlation data sets, via the profile module 230. In use, the focus data set can be independent of and distinct from the correlation data sets. The compression module 220 and/or the cluster module 225 can modify the focus data set to group variables included within the data set into separate clusters/segments.

The user interface module 210 can be a set of instructions, code, and/or one or more software modules that can cause a processor to render a user interface (e.g., a graphical user interface (GUI), and/or the like) on a display of a compute device (e.g., the user compute device 120 of FIG. 1). Example images including renditions of the user interface are shown with respect to FIGS. 3-6. The user interface can allow a non-technical audience to deploy a "one-sized-fits-most" segmentation workflow for defined data sets in a particular category, or attached to a particular market survey (e.g., the market surveys 142 of FIG. 1).

The data set module 215 can be a set of instructions, code, and/or one or more software modules that can cause a processor to retrieve data sets from a database (e.g., the database 140 of FIG. 1). For example, the data set module 215 can include SQL queries, which the processor can execute in the database to fetch the data sets and prepare them for further processing.

The compression module 220 can be a set of instructions, code, or one or more software modules that can cause the processor to reduce the number of variables (e.g., features, dimensions, etc.) in a data set (e.g., the focus data set) to produce a compressed representation of the data set. The compression module 220 can include or access a machine learning model for this purpose (also referred to herein as a compression model). The compression model can be and/or include, for example, principal component analysis (PCA), linear discriminant analysis (LDA), autoencoders, uniform manifold approximation and projection (UMAP), variants thereof (e.g., UMAP2, UMAP_Fact, PCA3, etc.), and/or the like. In data analysis, various reasons can exist for reducing the number of variables in a data set. The compression model can be stored in memory (e.g., the memory 134 of FIG. 1, memory included in a cloud-based storage service, etc.) and can be refined over time. The compression module 220 can, for example, improve computational efficiency during further processing of the data set, allow for easier visualization of the data set, reduce noise in the data set, and/or improve interpretative results associated with the data set.

API users can have several different strategies for dimension reduction (e.g., UMAP2, UMAP_Fact, PCA3, etc.) and for clusterability measure (e.g., DipTest45, etc.). UMAP_Fact, for example, is a hybrid compression model that can perform a factor analysis exclusively on any categorical variables in the data set and uses UMAP to compress the data set. In use, UMAP_Fact can prevent UMAP from defining axes based on single categorical variable splits. The factor analysis encourages multiple categorical variables to be first combined together to maximally explain variation in the data set, so that UMAP can select from combinations of those features. UI users can have the option of executing a compression model while optimizing (or improving) for clusterability measure.

The compression module 220 can cause the processor to search over possible configurations of the compression model to determine a multi-dimensional embedding space for the data set. In some implementations, the compression module 220 can cause the processor to determine a two-dimensional (2-D) embedding space, which can be easy to plot and can allow the user to visually verify that the embedding space contains dense segments that are alike in some way. In some implementations, the compression module 220 can cause the processor to search over possible configurations of the compression model to determine a 2-D embedding space that maximizes the "clusterability" of the data set. As used herein, clusterability refers to the ability of the cluster module 225 to produce distinct groups or clusters of variables in a data set based on similarity. The clusters of variables in a data set can distinguish similar consumer types from dissimilar consumer types (e.g., market users having similar or dissimilar demographic characteristics, behavioral patterns, purchasing preferences, and/or attitudinal tendencies). A data set with high clusterability can yield well-defined clusters with minimally overlapping boundaries, while a data set with low clusterability can yield ambiguous clusters with potentially overlapping boundaries. The compression module 220 can output a compressed representation of the data set (also referred to herein as a compressed data set), which can be input to the cluster module 225. The compressed data set can have high clusterability (e.g., regions that can be separated), thereby limiting the number of search iterations by the cluster module 225 than would be the case with a data set with low clusterability. Furthermore, the cluster module 225 can cause the processor to run "N" (e.g., 1, 5, 10, 25, 50, etc.) different attempts to fit the focus data set, in contrast to known approaches that often allow for 1 attempt each for N different data sets.

In some implementations, the compression module 220 can cause the processor to execute a model tuning method (e.g., a Bayesian search, a grid search, a random search, etc.) to determine a combination of hyperparameters for the compression model that can tune the compression model to optimize for the clusterability measure of the data set. For example, hyperparameters can include a learning rate, a batch size, a number of layers/units, regularization parameters, loss function weights, and or the like. In some implementations, the compression module 220 can cause the processor to determine the combination of hyperparameters from a predefined set of hyperparameters that tend to give consistently high-quality results.

Separating compression from clustering, and optimizing or greatly improving compression directly for clusterability, can be useful in the model-building process and address limitations of known approaches to market segmentation. In accordance with some embodiments of the present disclosure, the cluster module 225 can cause the processor to execute the cluster model iteratively on the same compressed data set, which can be optimized for clusterability by the compression model. This feature can reduce computational complexity associated with the cluster module 225, reducing the convergence time of the cluster model, thereby reducing the runtime of the market segmentation module 201. Known machine learning approaches to market segmentation can often use compression and clustering as part of a singular pipeline, choosing parameters for both the compression and clustering steps that directly optimize for goodness of fit (e.g. silhouette score). In some instances, a good-fitting model can be found. In some instances, the model can fit poorly. When the model fits poorly, known approaches often cannot determine whether the problem was due to ambiguous and overlapping segment boundaries, or an embedding space that did not allow for distinct and well-defined boundaries to begin with. This indetermination can stall known approaches to market segmentation, often necessitating human intervention or increasing runtime. By contrast, the market segmentation module 201 can cause the processor to preserve computational resources that might otherwise be wasted on separate compression and cluster iterations.

The cluster module 225 can be a set of instructions, code, or one or more software modules that can cause the processor to group variables in a data set (e.g., the focus data set) into clusters based on a measure of similarity among the variables. The cluster module 225 can cause the processor to determine a label for each cluster, which can be representative of the consumer type associated with the cluster. The cluster module 225 can include or access, for example, a machine learning model for this purpose (also referred to herein as a cluster model). The cluster model can be and/or include, for example, K-means, hierarchical density-based spatial clustering of applications with noise (HDBScan), random forests (RFClust, sidCluster, etc.), and/or the like. The cluster model can be stored in memory (e.g., the memory 134 of FIG. 1, memory included in a cloud-based storage service, etc.) and can be refined over time. The cluster module 225 can cause the processor to search over possible configurations of the cluster model to optimize for goodness of fit (e.g., to the compressed data set optimized for clusterability).

In some implementations, the cluster module 225 can cause the processor to execute a model tuning method (e.g., a Bayesian search, a grid search, a random search, etc.) to determine a combination of hyperparameters for the cluster model that can tune the compression model to optimize (or improve) for goodness of fit (or another measurement value). For example, hyperparameters can include a learning rate, a batch size, a number of layers/units, regularization parameters, loss function weights, and or the like. In some implementations, the cluster module 225 can cause the processor to determine the combination of hyperparameters from a predefined set of hyperparameters that tend to give consistently high-quality results.

In some implementations, the market segmentation module 201 can cause the processor to display (e.g., on a display of the user compute device 120 of FIG. 1) a plot representing the clusters in the data set, which is also referred to herein as a compression plot. For example, the compression plot can be a 2-D plot that visualizes the 2-D embedding space determined by the compression module 220, and/or the clusters determined by the cluster module 225. Example compression plots are shown with respect to FIGS. 4A-B. The compression plot can be a visual tool that a user of the system (e.g., the system of FIG. 1) can use to evaluate a performance/quality of the outputs from the compression module 220 and/or the cluster module 225. For instance, the user can assess whether the clusters have well-defined and distinct boundaries, or whether the clusters have ambiguous and overlapping boundaries. The user can, via the user interface of the user interface module 210, provide an indication of an evaluation of the plot to the device hosting/running the market segmentation module 201. A back-end compute device (e.g., the back-end compute device 130 of FIG. 1) can receive, from a user compute device (e.g., the user compute device 120 of FIG. 1), a signal indicative of a request associated with the evaluation of the plot. In response, the market segmentation module 201 can cause the processor to re-execute instructions of the compression module 220 and/or the cluster module 225. For instance, in response to receiving the signal indicative of the request, the cluster module 225 can cause the processor to determine a new set of clusters in the data set that are different from the prior set of clusters (the clusters originally displayed in the compression plot). The market segmentation module 201 can cause the processor to update the compression plot with the new data, which can be further processed.

The profile module 230 can be a set of instructions code, or one or more software modules that can cause the processor to interpret output from the compression module 220 and/or the cluster module 225. Interpreting can include statistically evaluating (e.g., via any suitable statistical significance test, such as a p-test, an f-test, a t-test, etc.) a data set to determine statistically significant variables and quantify their significance with an importance value (e.g., an f-score, etc.). The profile module 230 can cause the processor to generate statements of variable importance from the results of the statistical test. A statement of variable importance can include, for example, a variable name, an importance value for that feature, and values that indicate how the feature varies according to the response (e.g., an in-group (mean) value and an out-group (mean) value, or a high value and a low value, etc.). The statements of variable importance can be stored, for example, in a table of a database (e.g., the database 140 of FIG. 1). The profile module 230 can cause the processor to generate pseudosentences from the statements of variable importance, which can enable an LLM to interpret segment labels (or dimensions/axes) (e.g., via LLM module 235). The pseudosentences can be more suitable (or optimized) for LLM interpretation than the statements of variable importance and therefore facilitate more accurate outputs than would be possible using statements of variable importance. The pseudosentence can be, for example, a text-based (e.g., "plain-English") representation that describes the relationships among statistically significant variables. As used herein, pseudosentences are thus also referred to as correlation pseudosentences. Because the segment description can be predicted from the pseudosentences (via the LLM module 235), the segment description can also be said to describe the relationships among statistically significant variables in a way that is easy and intuitive for a user to understand.

In instances when the processor is interpreting output from the compression module 220, for example, a statement of variable importance can include an importance measure of a dimension of the compressed data set, a high value, and a low value. The high value can be a mean value of the feature at high values (e.g., a top 10 percentile) of the dimension. The low value can be a mean value of the feature at low values (e.g., a bottom 90th percentile) of the dimension. An example importance statement for an example dimension is provided in table 1:

TABLE 1

| Variable | Importance | P-value | High value | Low value |
|---|---|---|---|---|
| Age | 0.75 | N/A | 30 | 60 |

In instances when the processor is interpreting output from the cluster module 225, for example, a statement of variable importance can include an importance measure of a variable associated with a segment label, an in-group value, and an out-group value. An example importance statement for an example segment label is provided in table 2:

TABLE 2

| Variable | F-score | P-value | In-group | Out-group |
|---|---|---|---|---|
| Age | 35.4 | 0.03 | 50 | 55 |

The pseudosentence can be defined by a difference between the values that indicate how the feature varies across data set(s) and a direction represented by a sign of the difference. The in-group can represent a mean value of responses included within the example segment label, while the outgroup can represent a mean value of responses not included within the example segment label. In table 2, the difference between the in-group mean value and the out-group mean value is an integer, 5, and the sign of the difference is negative. Therefore, the profile module 230 can cause the processor to determine the direction as being "less than". The profile module 230 can further cause the processor to generate a pseudosentence that represents the variable itself. For example, for variable age, the processor can more specifically determine the direction as being "younger than". An example pseudosentence associated with the example importance statement (table 2) can thus be, "5 years younger on average than out-group". Interpreting statements of variable importance in the context of the variable can be a way that the processor can optimize the pseudosentence to be interpreted by the LLM.

The segment labels and/or dimensions being interpreted can include attitudinal variables, behavioral variables, demographic variables, and/or psychographic variables, which can be categorized into scaling variables, numerical variables, categorical variables, and the like. The profile module 230 can cause the processor to generate pseudosentences differently based on the type of variable being evaluated, using different templates.

When evaluating labels with scaling variables, the profile module 230 can cause the processor to compute, for example, an additive distance between the mean response between in-group/out-group for the survey question. For labels with scaling variables, the profile module 230 can include a template of the form, for example, "{tilt} to respond positively to {question}". For attitudinal data sets, {question} can be the text of the (scaling) variable. {tilt} can take the form of, for example, "More Likely/Slightly More Likely/About as Likely/Slightly Less Likely/Less Likely . . . " based on the differences in the mean response meeting a threshold value (e.g., a predefined threshold value). An example importance statement including attitudinal variables that are Likert variables is represented in table 3:

TABLE 3

| Variable | F-score | P-value | In-group | Out-group |
|---|---|---|---|---|
| Do you like ham? | 20 | 0.03 | 5 | 3.4 |
| Do you like cheese? | 10 | 0.05 | 3.5 | 3.9 |

For the variable "do you like ham?", the in-group in table 3 is more than the out-group by 1.6 units. The sign of the mean difference with respect to the in-group is positive, which can indicate that the in-group is at least about as likely, if not slightly more likely, or more likely to like ham than the out-group. The threshold values can provide the specific tilt to which the in-group likes ham more than the out-group. For example, the threshold value that can trigger a "more likely" tilt can be a mean difference of 1 units. In such an example, 1.6 units exceeds 1 units, and therefore an example pseudosentence for the statement of variable importance can be, "more likely to respond positively to 'do you like ham'?". For the variable "do you like cheese?", the in-group in table 3 is less than the out-group by 0.4 units. The sign of the mean difference with respect to the out-group is negative, which can indicate that the out-group is at least about as likely, if not slightly less likely, or less likely to like cheese than the out-group. The threshold value that can trigger a "slightly less likely" tilt can be, for example, 0.3 units. In such an example, 0.4 units exceeds 0.3 units, and therefore an example pseudosentence for the statement of variable importance can be, "slightly less likely to respond positively to 'do you like cheese?'".

The template for labels with categorical variables can be similar and can take the form, for example, "{tilt} to answer {question} with {response}". If presented as a categorical question rather than a scaling variable, the examples represented by table 3 can instead be represented by example table 4 below:

TABLE 4

| Variable | F-score | P-value | In-group | Out-group |
|---|---|---|---|---|
| What sandwich do you want?/ham | 20 | 0.00 | 0.5 | 0.3 |
| What sandwich do you want?/cheese | 10 | 0.03 | 0.6 | 0.7 |

Following the above logic, example pseudosentences for table 4 can be, "more likely to answer 'What sandwich do you want?' with ham" and "less likely to answer 'What sandwich do you want?' with cheese.

When evaluating dimensions with scaling variables, the profile module 230 can cause the processor to compute, for example, mean high values and mean low values instead of mean in-group and mean out-group values. The template for dimensions with scaling variables can take the form, for example, "{degree} {direction} correlation to the sentiment {variable}". The {degree} can be defined by the absolute difference between the mean high value and mean low value meeting threshold values. The {direction} can be defined by the sign of the difference. An example importance statement for a dimension is represented in table 5:

TABLE 5

| Variable | Importance | P-value | High value | Low value |
|---|---|---|---|---|
| Do you like ham? | 0.75 | N/A | 5 | 1 |
| Do you like cheese? | 0.25 | N/A | 3 | 4 |

For the variable "do you like ham?", the absolute difference between the high value and the low value is 4 units and the sign is positive. Following the logic above, an example pseudosentence for the example statement of variable importance can be, "strong positive correlation to the sentiment 'do you like ham'?". For the variable "do you like cheese?", the absolute difference between the high value and the low value is 1 and the sign is negative. An example pseudosentence for the example statement of variable importance can be, "weak negative correlation to the sentiment 'do you like cheese'?".

When evaluating dimensions with categorical variables, the template can take the form, for example, "a {degree}, {direction} {jump} when the buyer answers {question} with {response}". {jump} can be similar to the {direction} in that it can be defined by a sign of the difference between the high value and the low value. An example importance statement for a dimension is represented in table 6:

TABLE 6

| Variable | Importance | P-value | High value | Low value |
|---|---|---|---|---|
| What sandwich do you want?/ham | 0.20 | N/A | 0.5 | 0.3 |

TABLE 6-continued

| Variable | Importance | P-value | High value | Low value |
|---|---|---|---|---|
| What sandwich do you want?/cheese | 0.10 | N/A | 0.6 | 0.7 |

For the variable "what sandwich do you want?/ham", the absolute difference between the high value and the low value is 0.2 units and the sign is positive. Following the logic above, an example pseudosentence for the example statement of variable importance can be, "A strong positive increase when the buyer answers 'what sandwich do you want'? with 'ham'". For the variable "what sandwich do you want?/cheese", the absolute difference between the high value and the low value is 0.1 units and the sign is negative. An example pseudosentence for the example statement of variable importance can be, "A moderate negative decrease when the buyer answers 'what sandwich do you want'? with 'cheese'".

When evaluating segment labels with numerical variables, the template can take the form, for example, "{feature name} P % more/less/equal to the out-group {conditional text}." When evaluating dimensions with numerical variables, the template can take the form, for example, "a {degree}, {direction} correlation to {name} {condition}." The {conditional text} and {condition} can represent a filter function applied to the query (e.g., by the data set module 215) and defined by a target category and/or a scope. The target category can be provided as input to the market segmentation module 201 by a user of the system (e.g., the system of FIG. 1), as shown with respect to FIG. 3. As used herein, the target category is understood to mean a set of criteria that define a broad slice of transactions. The target category can be, for example, a type of product (e.g., "cold cereal", "hot sandwiches", "kitchen appliances", etc.), a type of retailer/distributer (e.g., "deli", "market", "grocer", etc.), a type of brand, a type of manufacturer (e.g., "semiconductors", "medical devices", etc.), combinations thereof, and/or the like. As used herein, the scope is understood to mean a hierarchy and a level of the hierarchy associated with the target category. For example, for target category "beer", the levels of hierarchy can include "alcohol" and/or "beverage". The profile module 230 can cause the processor to determine correlations for variables that are "in" scope (e.g., included within the same hierarchy). For example, the profile module 230 can cause the processor to determine correlations for variables related to "beer", such as "wine", "spirits", and/or the like. An example importance statement for a segment label with numerical variables is represented in table 7:

TABLE 7

| Variable | Importance | P-value | In-group | Out-group |
|---|---|---|---|---|
| Total_spend | 0.01 | N/A | 100 | 101 |
| majorcat@ham | 0.70 | N/A | 20 | 10 |
| majorcat@cheese | 0.50 | N/A | 25 | 30 |

In the example provided by table 7, the variable "total spend" can be from a behavioral data set that the profile module 230 caused to be scoped to, for example, "deli". Example pseudosentences for the statements of variable importance in table 7 can be, "total spend is 1% smaller than the out-group", "total spend is 100% larger than out-group when spend is limited to ham", and "total spend is 20% smaller than out-group when spend is limited to cheese".

The profile module 230 can cause the processor to input the pseudosentences into the LLM module 235.

In some implementations, the compressed data set from the compression module 220 can be input into the profile module 230. The profile module 230 can cause the processor to determine correlations between each dimension/axis of the compression data set with the individual variables in the data set and/or the correlation data sets. The profile module 230 can cause the processor to generate a set of pseudosentences from a number (e.g., about 6) of strong correlations. An example of a pseudosentence can be, "Axis 1 is highly correlated to total spend on hot dogs". The profile module 230 can cause the processor to pass the pseudosentences to the LLM module 235 to predict a segment description, including a name and description for each dimension/axis. The profile module 230 can cause the processor to repeat this process for each dimension/axis. The profile module 230 can cause the processor to display the segment description for review in both the output and the UI.

In some implementations, the clusters from the cluster module 225 can be input to the profile module 230. The profile module 230 can cause the processor to determine significance by, for example, recoding each segment label value as an in-group/out-group binary flag. Unlike compression, all variables in all data sets (e.g., the focus data set, the correlation data sets, etc.) in the database can be tested for significance. The profile module 230 can cause the processor to test each variable in all data sets for significance according to the relationship in-group to variable. The profile module 230 can cause the processor to rank order variables according to the strength of their differences (e.g., an F-score). The profile module 230 can cause the processor to translate a number (e.g., about 6 per data set) of strong correlations into pseudosentences (e.g. "75% more likely to order online"). The profile module 230 can cause the processor to pass the pseudosentences to the LLM module 235 to predict a segment description, including a name and description for each label. The profile module 230 can cause the processor to repeat this process for each segment label. The profile module 230 can cause the processor to display the segment description for review in both the output and the UI.

The LLM module 235 can be a set of instructions, code, or one or more software modules that can cause the processor to insert the pseudosentences into a prompt for a large language model (not shown), and to predict as output OUT from the LLM a segment description for each of the consumer type(s). The segment description can be a representation (e.g., text, audio, image, video, etc.) of the demographic characteristics, behavioral patterns, purchasing preferences, and attitudinal tendencies that distinguish a consumer type from other consumer types. The outputs OUT can be names, descriptions, and/or a list of important attributes defining and describing each segment, which can in part or collectively define a segment description for the type of consumer. The outputs OUT can be stored in memory (e.g., the memory 134 of FIG. 1, memory included in a cloud-based storage service, etc.). The prompt can include text that can be structured and/or formatted similar to the way that code is structured and/or formatted but which itself does not define code. For example, the prompt text can be configured to represent pseudocode. The pseudocode formatting is referred to herein as "code-style". Prompts without code but with code-style can cause the LLM to predict output that is less likely to be incorrect and is more likely be consistent for varying prompt content. In this way, prompts without code but with code-style can reduce a variance of output compared to prompts without code-style. Additionally, pseudosentences that are structured into a code-style format can cause the LLM to produce synergetic segment descriptions in comparison to solutions that lack pseudosentences and/or code-style format. A code-style prompt can include, for example, a role description for the LLM and a list of the pseudosentences. The pseudosentences can be, for example, grouped by the type of data set they describe (e.g., demographic "facts", behavioral facts, attitudinal facts, psychographic facts, and/or the like). Example pseudosentences are shown with respect to FIGS. 5A-B.

In some implementations, the prompt text can include instructions to generate pixel-based output (e.g., images, video, etc.) that illustrates a segment label and description. For example, the pixel-based output can include an image illustrating what a type of consumer could look like, objects or environments that a type of consumer might enjoy, or other suitable content that is based on the pseudosentences in the prompt. Instead, or in addition, the pixel-based output can include a video illustrating interactions involving a type of consumer, or other suitable content that is based on the pseudosentences in the prompt.

In some implementations, the prompt text can include instructions to generate audio that acoustically represents a segment label and description. For example, the audio-based output can include an audio clip of an exchange involving a type of consumer, attitudes that a type of consumer might have, or other suitable content that is based on the pseudosentences in the prompt. Such pixel-based output and/or audio-based output can have various benefits by providing further depth and detail to a type of consumer compared to known approaches. Collectively, different output modalities can provide a more complete description to a type of consumer (and in less time) compared to known approaches.

Figure 6:
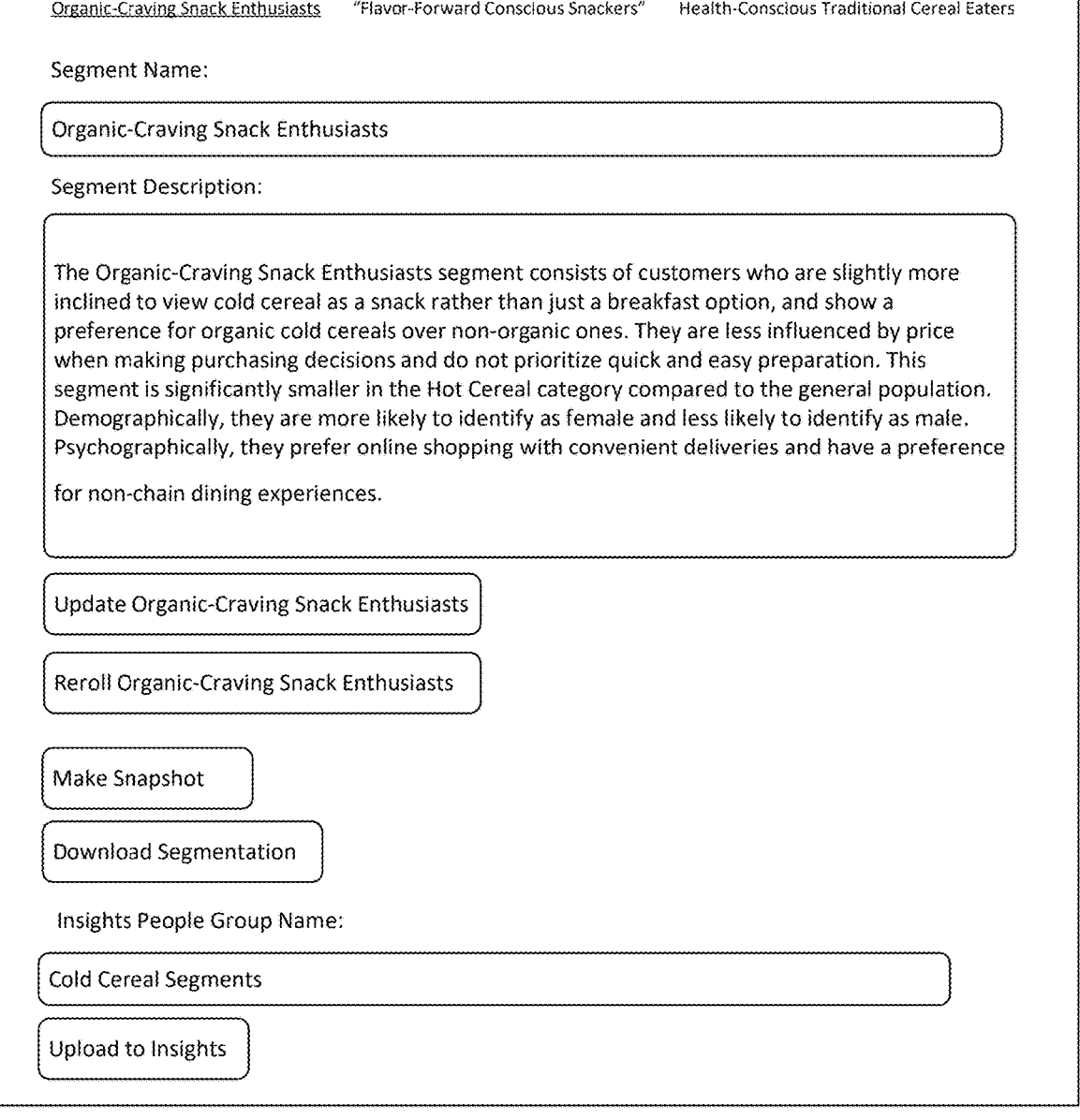
FIG. 6 shows an example image of a user interface associated with the market segmentation module, according to an embodiment.

In some implementations, the market segmentation module 201 can cause the processor to display (e.g., on a display of the user compute device 120 of FIG. 1) a representation (e.g., text, images, video, etc.) of the segment description, as shown with respect to FIG. 6. A user of the system (e.g., the system of FIG. 1) can evaluate the segment description for accuracy. The user can, via the user interface of the user interface module 210, provide an indication of an evaluation of the segment description to the device hosting/executing the market segmentation module 201. A back-end compute device (e.g., the back-end compute device 130 of FIG. 1) can receive, from a user compute device (e.g., the user compute device 120 of FIG. 1), a signal indicative of a request associated with the evaluation of the segment description. In response, the market segmentation module 201 can cause the processor to re-execute instructions of the profile module 230 and/or the LLM module 235. For instance, in response to receiving the signal indicative of the request, the profile module 230 can cause the processor to determine a new set of pseudosentences that are different from the prior set of pseudosentences (e.g., based on different significant variables and accompanying statements of variable importance). The market segmentation module 201 can cause the processor to update the display with a new segment description. The market segmentation module 201 can cause the processor to send data representing the new segment description (e.g., a file such as a document, etc.) to the user compute device.

Instead, or in addition, the user can, via the user interface of the user interface module 210, edit or otherwise update the segment description (e.g., delete text, add text, etc.). The back-end compute device can receive the (new) input text of the edited segment description from the user compute device. The market segmentation module 201 can cause the processor to send data representing the new segment description (e.g., a file such as a document, etc.) to the user compute device.

Returning to FIG. 2, the encoder module 240 can be a set of instructions, code, or one or more software modules that can cause the processor to train a supervised machine learning model to predict segment labels for variables in the data sets. The supervised machine learning model can be any suitable machine learning model, such as, for example, a neural network, a support vector machine, a random forest, a decision tree (e.g., extreme gradient boosting (XGB)), and/or the like. The encoder module 240 can cause the processor to fit the supervised machine learning model using, for example, a cross-validation approach with Bayesian Search, grid search, random search, and/or the like to select hyperparameters. The supervised machine learning model can be trained using a training data set. The training data set can be and/or include labeled data (e.g., variables with segment labels), which can be obtained using, for example, the compression module 220, the cluster module 225, a user (e.g., a human analyst), and/or another suitable method. In this way, the processor can be caused to produce training data set(s). In some implementations, the encoder module 240 can obviate the compression module 220 and/or the cluster module 225, in that the encoder module 240 can cause the processor to predict segment labels using the supervised machine learning model instead of the compression model and/or the cluster model.

FIG. 3 shows an example image of a user interface associated with the market segmentation module, according to an embodiment. The user interface module (e.g., the user interface module 210 of FIG. 2) can cause the processor (e.g., the processor 132 of FIG. 1) to receive inputs (e.g., the inputs IN of FIG. 2) from a user interacting with the user interface. The user can specify which data set the market segmentation module 201 can cause to be segmented (e.g., an attitudinal segmentation, as shown). The user can also specify which data set(s), if any, the market segmentation module 201 can cross-reference to check for correlations (e.g., behavioral, demographic, and psychographic correlates, as shown), optionally during a time period defined by a start time and an end time. The correlate data sets can be configured to not include the focus data set. The user can specify, for example, a start date and an end date that the data set module (e.g., the data set module 215 of FIG. 2) can use to filter a data set via a database (e.g., the database 140 of FIG. 1) query. The survey ID can represent an identifier associated with a particular market survey from a collection of market surveys (e.g., the market surveys 142 of FIG. 1), which the data set module can use to filter a data set via a database query. The user can also specify a product scope and/or scope value, as shown. The product scope and scope value can be structurally and/or functionally similar to the scope and target category described in FIG. 1, respectively. The data set module can use the product scope and scope value to filter a data set via a database query. In this way, the scope value can define at least in part the data set being segmented (e.g., a behavioral data set).

Figure 4A:
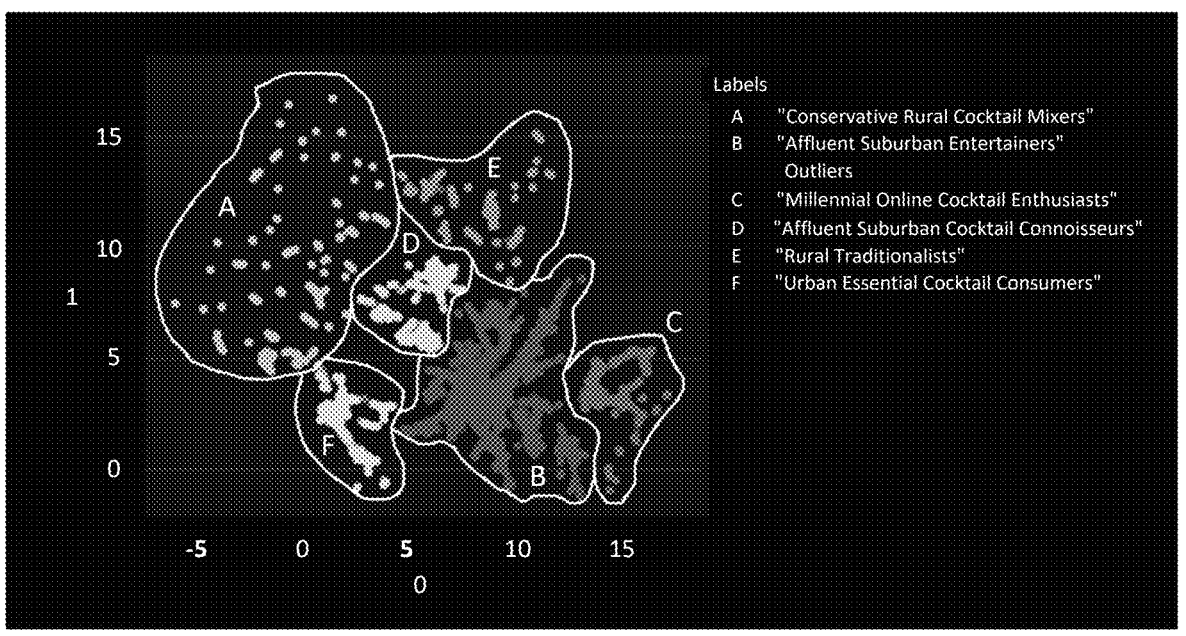
FIG. 4A shows an example image of a compression plot with high clusterability, according to an embodiment.

FIG. 4A shows an example image of a compression plot with high clusterability, according to an embodiment. The clusters in the compression plot are example clusters that have well-defined and distinct boundaries. Each data point in the compression plot can be a representation of a variable included within the focus data set and can be visually distinct (e.g., via visual indicators such as color, shape, etc.) from other data points of other clusters. Each cluster can have a cluster/segment label. As shown in FIG. 4A, the segment labels include "conservative rural cocktail mixers" (represented by "A"), "affluent suburban entertainers" (represented by "B"), "millennial online cocktail enthusiasts" (represented by "C"), "affluent suburban cocktail connoisseurs" (represented by "D"), "rural traditionalists" (represented by "E"), and "urban essential cocktail consumers" (represented by "F"). An additional label, "outliers" (not shown in FIG. 4A) can be given to variables that are not statistically significant (e.g., do not have strong correlations to any cluster in the data set).

Figure 4B:
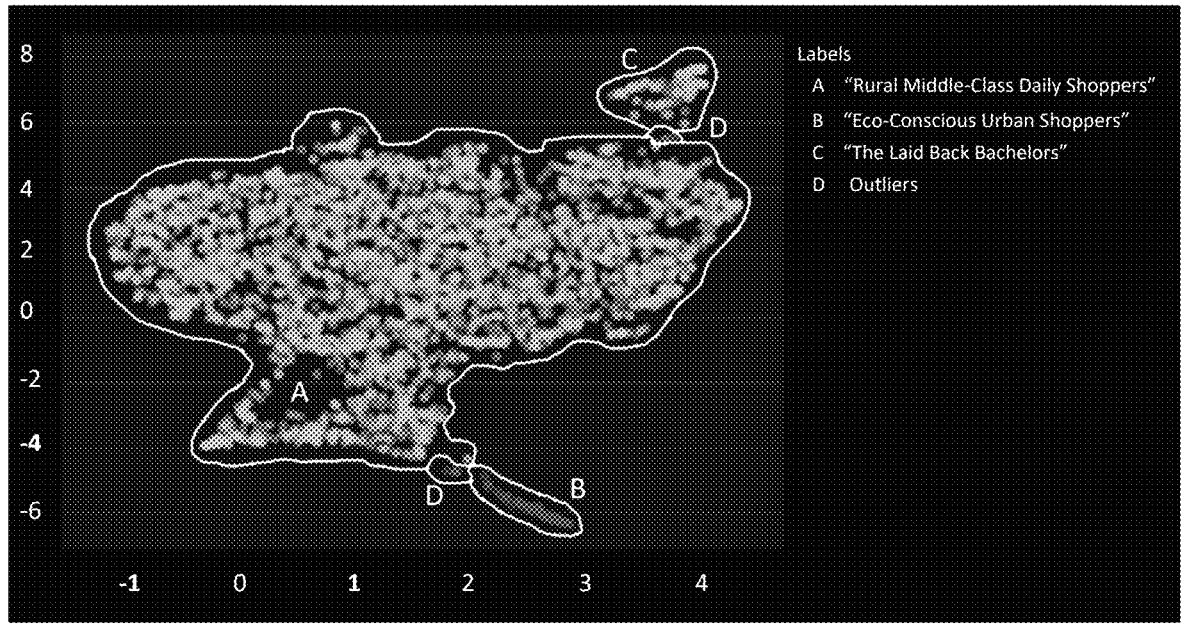
FIG. 4B shows an example image of a compression plot with low clusterability, according to an embodiment.

FIG. 4B shows an example image of a compression plot with low clusterability, according to an embodiment. The clusters in the compression plot are example clusters that have ambiguous boundaries. As shown in FIG. 4B, the segment labels include "rural middle-class daily washers" (represented by "A"), "eco-conscious urban shoppers" (represented by "B"), and "the laid back bachelors" (represented by "C"). An additional "outlier" label (represented by "D") can be given to variables that are not statistically significant. As shown, the "outlier" label is given to two example clusters, each of which is bounded by the example cluster with segment label "rural middle-class daily washers". A compression plot with low clusterability can precipitate re-execution.

FIG. 5A shows an example image of a code-style prompt with pseudosentences for a distinct cluster, according to an embodiment. The code-style prompt includes a role for the LLM, a list of pseudosentences structured as pseudocode, and instructions to generate a name and description for the segment. The list of pseudosentences includes behavioral facts, demographic facts, and psychographic facts. The LLM (e.g., the LLM 136 of FIG. 1) can output a segment label and description for the distinct segment, which as shown in FIG. 5A is "millennial online cocktail enthusiasts".

FIG. 5B shows an example image of a code-style prompt with pseudosentences for an ambiguous cluster, according to an embodiment. The code-style prompt includes a role for the LLM, a list of pseudosentences structured as pseudocode, and instructions to generate a name and description for the segment. The list of pseudosentences includes behavioral facts, demographic facts, and psychographic facts. The LLM (e.g., the LLM 136 of FIG. 1) can output a segment label and description for the ambiguous segment, which as shown in FIG. 5B is "rural traditionalists".

FIG. 6 shows an example image of a user interface associated with the market segmentation module, according to an embodiment. The outputs from the market segmentation module (e.g., the market segmentation module 201 of FIG. 2) can include a segment name and a segment description. The outputs can be displayed on a display of a user compute device (e.g., the user compute device 120 of FIG. 1), as shown. The outputs can be stored in memory (e.g., the memory 134 of FIG. 1), sent to the user compute device, modified by the user, and/or caused to be updated. In some implementations, the outputs can also include a compression plot (e.g., the compression plots shown in FIGS. 4A-4B), which can visualize observations on the compressed 2-dimensional axes and colored according to labels, with label names in the legend and descriptions available on hover text. In some implementations, the outputs can also include the pseudosentences (e.g., the pseudosentences shown in FIGS. 5A-5B), to help aid troubleshooting. Whether using the UI or the API, the system (e.g., the system of FIG. 1) can provide simple options to edit segment interpretations, along with another option to simply regenerate the interpretations entirely by re-prompting the LLM for the segment. This way, the human user can have complete control of the segment names/descriptions, and can edit them accordingly.

FIG. 7 shows a flow diagram of an example method 700 for running the market segmentation module, according to an embodiment. The example method 700 can be implemented by a processor (e.g., the processor 132 of FIG. 1). As shown in FIG. 7, the example method 700 includes, at 705, receiving, from a user compute device, a signal representative of a selection of at least one of a first data set or a plurality of second data sets. The example method 700 also includes, at 710, inputting, without human intervention, the first data set to a machine learning model to generate a plurality of clusters in the first data set, each cluster from the plurality of clusters associated with a consumer type. The example method 700 also includes, at 715, determining, without human intervention, a plurality of statistically significant variables in a cluster from the plurality of clusters based on statistical significance tests including variables in at least one of the first data set or the plurality of second data sets. The example method 700 also includes, at 720, generating, without human intervention, a set of pseudosentences associated with the cluster based on an in-group value and an out-group value for each statistically significant variable from the plurality of statistically significant variables. The example method 700 also includes, at 725, sending, without human intervention, a signal to cause the set of pseudosentences to be inserted into a first no-code prompt for a large language model to predict a segment description for the consumer type associated with the cluster, the first no-code prompt having a code-style to reduce a variance of the segment description relative to an output from the large language model based on a second no-code prompt without the code-style, the segment description being a representation of relationships among each statistically significant variable from the plurality of statistically significant variables based on the set of pseudosentences. The example method 700 also includes, at 730, sending, to the user compute device, data representing the segment description.

In some such implementations, the first data set is any one of an attitudinal data set, a behavioral data set, a demographic data set, or a psychographic data set, and the plurality of second data sets (1) includes at least one of the behavioral data set, the demographic data set, the psychographic data set, or the attitudinal data set and (2) does not include the first data set.

In some such implementations, the segment description is a first segment description, the set of pseudosentences is a first set of pseudosentences, the plurality of statistically significant variables is a first plurality of statistically significant variables, the non-transitory, processor-readable medium storing further instructions that cause the processor further to: receive, from the user compute device, a signal indicative of a request associated with an evaluation of the segment description; generate, without human intervention, a second set of pseudosentences associated with the cluster based on an in-group value and an out-group value for each statistically significant variable from a second plurality of statistically significant variables; send, without human intervention, a signal to cause the second set of pseudosentences to be inserted into a third no-code prompt for the large language model to predict a second segment description for the consumer type associated with the cluster; and send, to the user compute device, data representing the second segment description.

In some such implementations, the segment description is a first segment description, the non-transitory, processor-readable medium storing further instructions that cause the processor further to: update, in response to receiving input text from the user compute device, the first segment description with the input text to produce a second segment description; and send, to the user compute device, data representing the second segment description.

In some such implementations, the in-group value is an in-group mean value, the out-group value is an out-group mean value, and the set of pseudosentences are defined by a difference of the in-group mean value and the out-group mean value meeting a threshold value and a direction represented by a sign of the difference.

In some such implementations, each statistically significant variable from the plurality of statistically significant variables in the first data set is a compressed representation of at least one variable from a third data set, the third data set being input to a compression model to produce the first data set.

In some such implementations, the machine learning model is a first machine learning model, the non-transitory, processor-readable medium storing further instructions that cause the processor further to: produce a training data set based on the plurality of statistically significant variables, each statistically significant variable having a label associated with the segment description; train a second machine learning model based on the training data set; and predict a plurality of labels for a plurality of variables in a third data set based on inputting a third data set into the second machine learning model.

In some embodiments, a method comprises: determining, using a processor of a first compute device and without human intervention, a plurality of statistically significant variables in a cluster associated with a first data set based on a statistical significance test including variables in at least one of the first data set or a plurality of second data sets, the cluster being associated with a consumer type; generating, using the processor and without human intervention, a set of pseudosentences associated with the cluster based on a high value and a low value for each statistically significant variable from the plurality of statistically significant variables; sending, without human intervention, a signal to cause the set of pseudosentences to be inserted into a first no-code prompt for a large language model to predict a segment description for the consumer type associated with the cluster, the first no-code prompt having a code-style to reduce a variance of the segment description relative to output from the large language model based on a second no-code prompt without the code-style, the segment description being a representation of relationships among each statistically significant variable from the plurality of statistically significant variables based on the set of pseudosentences; and sending, from the first compute device and to a second compute device, data representing the segment description.

In some such implementations, the high value for each statistically significant variable is a first mean value in at least one of the first data set or the plurality of second data sets, the low value for each statistically significant variable is a second mean value in at least one of the first data set or the plurality of second data sets, the set of pseudosentences are defined by a difference of the high value and the low value meeting a threshold value and a direction represented by a sign of the difference.

In some such implementations, the first data set is an attitudinal data set, the plurality of statistically significant variables includes at least one of one-hot encoded variables or scaling variables, and the plurality of second data sets includes at least one of a behavioral data set, a demographic data set, or a psychographic data set.

In some such implementations, the first data set is a behavioral data set defined in part by a target category, the plurality of statistically significant variables are numerical variables, and the plurality of second data sets includes at least one of an attitudinal data set, a demographic data set, or a psychographic data set.

In some such implementations, the segment description is a first segment description, the method further comprising: receiving, from the second compute device, a signal indicative of a request associated with an evaluation of the first segment description; generating, without human intervention, a second set of pseudosentences associated with the cluster based on an high value and low value for each statistically significant variable from a second plurality of statistically significant variables; sending, without human intervention, a signal to cause the second set of pseudosentences to be inserted into a third no-code prompt for the large language model to predict a second segment description for the consumer type associated with the cluster; and sending, from the first compute device and to the second compute device, data including the second segment description.

In some such implementations, each statistically significant variable from the plurality of statistically significant variables in the first data set is a compressed representation of at least one variable from a third data set, the third data set being input to a compression model to produce the first data set.

In some such implementations, the segment description is a first segment description, the method further comprising: updating, in response to receiving input text from the second compute device, the first segment description with the input text to produce a second segment description; and sending, from the first compute device and to the second compute device, data representing the second segment description.

In some such implementations, the method further comprises: sending, from the first compute device and to the second compute device before determining the plurality of statistically significant variables, a signal to cause a display of the second compute device to display a plot including the first data set; receiving, from the second compute device, a signal indicative of a request associated with an evaluation of the plot; and inputting, using the processor, the first data set to a machine learning model to generate a plurality of clusters that is in the first data set and that includes the cluster.

In some embodiments, a non-transitory, processor-readable medium, storing instructions that, when executed by a processor, cause the processor to: send, to a user compute device, a signal to cause a display at the user compute device to display a plot representing a first plurality of clusters in a first data set, each cluster from the first plurality of clusters being associated with a consumer type; receive, from the user compute device, a signal indicative of a request associated with an evaluation of the plot; input, without human intervention, the first data set to a machine learning model to generate a second plurality of clusters in the first data set; determine, without human intervention, a plurality of statistically significant variables in a cluster from the second plurality of clusters based on a statistical significance test for variables in at least one of the first data set or a plurality of second data sets; generate, without human intervention, a set of pseudosentences associated with the cluster from the second plurality of clusters based on an in-group value and an out-group value for each statistically significant variable from the plurality of statistically significant variables; send, without human intervention, a signal to cause the set of pseudosentences to be inserted into a first no-code prompt for a large language model to predict a segment description for the consumer type associated with the cluster from the second plurality of clusters, the first no-code prompt having a code-style to reduce a variance of the segment description relative to output from the large language model based on a second no-code prompt without the code-style, the segment description being a representation of relationships among each statistically significant variable from the plurality of statistically significant variables based on the set of pseudosentences; and send, to the user compute device, data representing the segment description for the cluster from the second plurality of clusters.

In some such implementations, the first data set is any one of an attitudinal data set, a behavioral data set, a demographic data set, or a psychographic data set and the plurality of second data sets (1) includes at least one of the behavioral data set, the demographic data set, the psychographic data set, or the attitudinal data set and (2) does not include the first data set.

In some such implementations, the machine learning model is a first machine learning model, the non-transitory, processor-readable medium storing further instructions that cause the processor further to: produce a training data set based on the plurality of statistically significant variables, each statistically significant variable having a label associated with the segment description; train a second machine learning model based on the training data set; and predict a plurality of labels for a plurality of variables in a third data set based on inputting the third data set into the second machine learning model.

In some such implementations, the segment description is a first segment description, the set of pseudosentences is a first set of pseudosentences, the non-transitory, processor-readable medium storing further instructions that cause the processor further to: receive, from the user compute device, a signal indicative of a request associated with an evaluation of the first segment description; generate, without human intervention, a second set of pseudosentences associated with the cluster based on an in-group value and an out-group value for each statistically significant variable from a second plurality of statistically significant variables different from the first plurality of statistically significant variables; send, without human intervention, a signal to cause the second set of pseudosentences to be inserted into a third no-code prompt for the large language model to predict a second segment description for the consumer type associated with the cluster; and send, to the user compute device, data representing the second segment description.

In some such implementations, the segment description is a first segment description, the non-transitory, processor-readable medium storing further instructions that cause the processor further to: update, in response to receiving input text from the user compute device, the first segment description with the input text to produce a second segment description for the consumer type associated with the cluster; and send, to the user compute device, data representing the second segment description.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EE-PROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory, processor-readable medium storing instructions that, when executed by a processor, cause the processor to:
   receive, from a user compute device, a signal representative of a selection of at least one of a first data set or a plurality of second data sets
   input, without human intervention, the first data set to a machine learning model to generate a plurality of clusters in the first data set, each cluster from the plurality of clusters associated with a consumer type;
   determine, without human intervention, a plurality of statistically significant variables in a cluster from the plurality of clusters based on statistical significance tests including variables in at least one of the first data set or the plurality of second data sets;
   generate, without human intervention, a set of pseudosentences associated with the cluster based on an in-group value and an out-group value for each statistically significant variable from the plurality of statistically significant variables;
   send, without human intervention, a signal to cause the set of pseudosentences to be inserted into a first no-code prompt for a large language model to predict a segment description for the consumer type associated with the cluster, the first no-code prompt having a code-style to reduce a variance of the segment description relative to an output from the large language model based on a second no-code prompt without the code-style, the segment description being a representation of relationships among each statistically significant variable from the plurality of statistically significant variables based on the set of pseudosentences; and
   send, to the user compute device, data representing the segment description.

2. The non-transitory, processor-readable medium of claim 1, wherein:
   the first data set is any one of an attitudinal data set or a behavioral data set, and
   the plurality of second data sets (1) includes at least one of the attitudinal data set or the behavioral data set, and (2) does not include the first data set.

3. The non-transitory, processor-readable medium of claim 1, wherein the segment description is a first segment description, the set of pseudosentences is a first set of pseudosentences, the plurality of statistically significant variables is a first plurality of statistically significant variables, the non-transitory, processor-readable medium storing further instructions that cause the processor further to:
   receive, from the user compute device, a signal indicative of a request associated with an evaluation of the segment description;
   generate, without human intervention, a second set of pseudosentences associated with the cluster based on an in-group value and an out-group value for each statistically significant variable from a second plurality of statistically significant variables;
   send, without human intervention, a signal to cause the second set of pseudosentences to be inserted into a third no-code prompt for the large language model to predict a second segment description for the consumer type associated with the cluster; and
   send, to the user compute device, data representing the second segment description.

4. The non-transitory, processor-readable medium of claim 1, wherein the segment description is a first segment description, the non-transitory, processor-readable medium storing further instructions that cause the processor further to:
   update, in response to receiving input text from the user compute device, the first segment description with the input text to produce a second segment description; and
   send, to the user compute device, data representing the second segment description.

5. The non-transitory, processor-readable medium of claim 1, wherein:
   the in-group value is an in-group mean value, the out-group value is an out-group mean value, and
   the set of pseudosentences are defined by a difference of the in-group mean value and the out-group mean value meeting a threshold value and a direction represented by a sign of the difference.

6. The non-transitory, processor-readable medium of claim 1, wherein:
   each statistically significant variable from the plurality of statistically significant variables in the first data set is a compressed representation of at least one variable from a third data set,
   the third data set being input to a compression model to produce the first data set.

7. The non-transitory, processor-readable medium of claim 1, wherein the machine learning model is a first machine learning model, the non-transitory, processor-readable medium storing further instructions that cause the processor further to:

produce a training data set based on the plurality of statistically significant variables, each statistically significant variable having a label associated with the segment description;

train a second machine learning model based on the training data set; and predict a plurality of labels for a plurality of variables in a third data set based on inputting a third data set into the second machine learning model.

8. A method, comprising:

determining, using a processor of a first compute device and without human intervention, a plurality of statistically significant variables in a cluster associated with a first data set based on a statistical significance test including variables in at least one of the first data set or a plurality of second data sets, the cluster being associated with a consumer type;

generating, using the processor and without human intervention, a set of pseudosentences associated with the cluster based on a high value and a low value for each statistically significant variable from the plurality of statistically significant variables;

sending, without human intervention, a signal to cause the set of pseudosentences to be inserted into a first no-code prompt for a large language model to predict a segment description for the consumer type associated with the cluster, the first no-code prompt having a code-style to reduce a variance of the segment description relative to output from the large language model based on a second no-code prompt without the code-style, the segment description being a representation of relationships among each statistically significant variable from the plurality of statistically significant variables based on the set of pseudosentences; and sending, from the first compute device and to a second compute device, data representing the segment description.

9. The method of claim 8, wherein:

the high value for each statistically significant variable is a first mean value in at least one of the first data set or the plurality of second data sets, the low value for each statistically significant variable is a second mean value in at least one of the first data set or the plurality of second data sets, the set of pseudosentences are defined by a difference of the high value and the low value meeting a threshold value and a direction represented by a sign of the difference.

10. The method of claim 8, wherein:

the first data set is an attitudinal data set, the plurality of statistically significant variables includes at least one of one-hot encoded variables or scaling variables, and the plurality of second data sets includes a behavioral data set.

11. The method of claim 8, wherein:

the first data set is a behavioral data set defined in part by a target category, the plurality of statistically significant variables are numerical variables, and the plurality of second data sets includes an attitudinal data set.

12. The method of claim 8, wherein the segment description is a first segment description, the method further comprising:

receiving, from the second compute device, a signal indicative of a request associated with an evaluation of the first segment description;

generating, without human intervention, a second set of pseudosentences associated with the cluster based on a high value and a low value for each statistically significant variable from a second plurality of statistically significant variables;

sending, without human intervention, a signal to cause the second set of pseudosentences to be inserted into a third no-code prompt for the large language model to predict a second segment description for the consumer type associated with the cluster; and sending, from the first compute device and to the second compute device, data including the second segment description.

13. The method of claim 8, wherein each statistically significant variable from the plurality of statistically significant variables in the first data set is a compressed representation of at least one variable from a third data set, the third data set being input to a compression model to produce the first data set.

14. The method of claim 8, wherein the segment description is a first segment description, the method further comprising:

updating, in response to receiving input text from the second compute device, the first segment description with the input text to produce a second segment description; and sending, from the first compute device and to the second compute device, data representing the second segment description.

15. The method of claim 8, further comprising:

sending, from the first compute device and to the second compute device before determining the plurality of statistically significant variables, a signal to cause a display of the second compute device to display a plot including the first data set;

receiving, from the second compute device, a signal indicative of a request associated with an evaluation of the plot; and inputting, using the processor, the first data set to a machine learning model to generate a plurality of clusters that is in the first data set and that includes the cluster.

16. A non-transitory, processor-readable medium, storing instructions that, when executed by a processor, cause the processor to:

send, to a user compute device, a signal to cause a display at the user compute device to display a plot representing a first plurality of clusters in a first data set, each cluster from the first plurality of clusters being associated with a consumer type;

receive, from the user compute device, a signal indicative of a request associated with an evaluation of the plot;

input, without human intervention, the first data set to a machine learning model to generate a second plurality of clusters in the first data set;

determine, without human intervention, a plurality of statistically significant variables in a cluster from the second plurality of clusters based on a statistical significance test for variables in at least one of the first data set or a plurality of second data sets;

generate, without human intervention, a set of pseudosentences associated with the cluster from the second plurality of clusters based on an in-group value and an out-group value for each statistically significant variable from the plurality of statistically significant variables;

send, without human intervention, a signal to cause the set of pseudosentences to be inserted into a first no-code prompt for a large language model to predict a segment description for the consumer type associated with the cluster from the second plurality of clusters, the first no-code prompt having a code-style to reduce a variance of the segment description relative to output from the large language model based on a second no-code prompt without the code-style, the segment description being a representation of relationships among each statistically significant variable from the plurality of statistically significant variables based on the set of pseudosentences; and send, to the user compute device, data representing the segment description for the cluster from the second plurality of clusters.

17. The non-transitory, processor-readable medium of claim 16, wherein the first data set is any one of an attitudinal data set or a behavioral data set, and the plurality of second data sets (1) includes at least one of the behavioral data set or the attitudinal data set and (2) does not include the first data set.

18. The non-transitory, processor-readable medium of claim 16, wherein the machine learning model is a first machine learning model, the non-transitory, processor-readable medium storing further instructions that cause the processor further to:

produce a training data set based on the plurality of statistically significant variables, each statistically significant variable having a label associated with the segment description;

train a second machine learning model based on the training data set; and predict a plurality of labels for a plurality of variables in a third data set based on inputting the third data set into the second machine learning model.

19. The non-transitory, processor-readable medium of claim 16, wherein the segment description is a first segment description, the set of pseudosentences is a first set of pseudosentences, the plurality of statistically significant variables is a first plurality of statistically significant variables, the non-transitory, processor-readable medium storing further instructions that cause the processor further to:

receive, from the user compute device, a signal indicative of a request associated with an evaluation of the first segment description;

generate, without human intervention, a second set of pseudosentences associated with the cluster based on an in-group value and an out-group value for each statistically significant variable from a second plurality of statistically significant variables different from the first plurality of statistically significant variables;

send, without human intervention, a signal to cause the second set of pseudosentences to be inserted into a third no-code prompt for the large language model to predict a second segment description for the consumer type associated with the cluster; and send, to the user compute device, data representing the second segment description.

20. The non-transitory, processor-readable medium of claim 16, wherein the segment description is a first segment description, the non-transitory, processor-readable medium storing further instructions that cause the processor further to:

update, in response to receiving input text from the user compute device, the first segment description with the input text to produce a second segment description for the consumer type associated with the cluster; and send, to the user compute device, data representing the second segment description.

* * * * *